(12) United States Patent
Yonemura et al.

(10) Patent No.: US 6,193,331 B1
(45) Date of Patent: Feb. 27, 2001

(54) VEHICULAR BRAKE SYSTEM FOR PERFORMING EFFECTIVE BRAKE OPERATIONS

(75) Inventors: Syuichi Yonemura, Anjo; Youichi Abe, Kariya; Mamoru Sawada, Yokkaichi, all of (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,768

(22) Filed: Dec. 30, 1999

Related U.S. Application Data (62) Division of application No. 08/847,638, filed on Apr. 25, 1997, now Pat. No. 6,027,184.

(30) Foreign Application Priority Data

Apr. 25, 1996 (JP) .................................................. 08-105383

(51) Int. Cl.$^7$ ....................................................... B60T 8/62
(52) U.S. Cl. .......................... 303/186; 303/11; 303/115.4; 303/116.1; 303/140; 303/147
(58) Field of Search ................................. 303/115.4, 140, 303/146, 147, 116.1, 116.2, 161, 186, 187, 188, 10, 11

(56) References Cited

U.S. PATENT DOCUMENTS

| | | |
|---|---|---|
| 2,904,069 | 9/1959 | Ostwald . |
| 3,232,057 | 2/1966 | Kersting . |
| 5,229,944 * | 7/1993 | Yasuno ................................... 30/186 |
| 5,312,174 * | 5/1994 | Beilfuss et al. .................... 303/116.1 |
| 5,378,120 * | 1/1995 | Taig ...................................... 417/322 |
| 5,405,191 * | 4/1995 | Nishiyama et al. ............... 303/116.1 |
| 5,462,343 | 10/1995 | Yoshida et al. . |
| 5,558,415 * | 9/1996 | Buschmann et al. ................. 303/186 |

FOREIGN PATENT DOCUMENTS

| | | |
|---|---|---|
| 3136616 | 3/1983 | (DE) . |
| 3424912 | 1/1986 | (DE) . |
| 4029793 | 3/1992 | (DE) . |
| 4319865 | 10/1994 | (DE) . |
| 0317182 | 5/1989 | (EP) . |
| 0566344 | 10/1993 | (EP) . |
| 2137709 | 10/1984 | (GB) . |
| 1-115760 | 5/1989 | (JP) . |
| 4-154460 | 5/1992 | (JP) . |
| 63-215466 | 9/1998 | (JP) . |
| 95/22477 | 8/1995 | (WO) . |

* cited by examiner

Primary Examiner—Robert J. Oberleitner
Assistant Examiner—Robert A. Siconolfi
(74) Attorney, Agent, or Firm—Pillsbury Madison & Sutro LLP

(57) ABSTRACT

A first fluid line couples first and second wheel cylinders. A second fluid line couples third and fourth wheel cylinders. A first pressure increasing unit increases pressure applied to the first and second wheel cylinders to a second pressure level which is greater than a first pressure generated by a master cylinder. When the first pressure increasing unit is in operation, a pressure difference setting unit sets a difference between pressure applied to the first and second wheel cylinders and pressure applied to the third and fourth wheel cylinders.

44 Claims, 6 Drawing Sheets

FIG. 11

VEHICULAR BRAKE SYSTEM FOR PERFORMING EFFECTIVE BRAKE OPERATIONS

CROSS-REFERENCE TO RELATED APPLICATION

This is a division of application Ser. No. 08/847,638, filed Apr. 25, 1997 now U.S. Pat. No. 6,027,184.

This application is related to and claims priority from Japanese Patent Application No. Hei-8-105383, the contents of which are hereby incorporated by reference.

BACKGROUND OF THE INVENTION

1. Field of the Invention

The present invention relates to a vehicular brake system. In particular, the present invention relates to a vehicular brake system for generating a wheel brake force greater than a brake force corresponding to depressing a brake pedal.

2. Description of Related Art

Load transfer in a vehicle chassis occurs during braking operations of a vehicle. Load transfer is influenced by the vehicle's deceleration which results in a gradual increase in the load on the front wheels of the vehicle. To deal with such problems, proportional control valves, for example, have been provided in the rear wheels to make pressure applied to the rear wheels lower than the pressure applied on the front wheels so that the brake forces generated on the rear wheels are lower than brake forces generated on the front wheels. These widely known proportional control valves reduce the amount of brake fluid in the direction of the brake fluid flow based on predetermined attenuation ratios.

When such a proportional control valve is provided, even if there is actually a high brake pressure in the master cylinder due to the demand for a high braking force, the brake pressure applied to the wheel cylinders is reduced by the proportional control valve which results in a smaller brake force. Thus, performance efficiency of the brake system declines because a significant amount of brake pressure is wasted when generating a large brake force.

SUMMARY OF THE INVENTION

In view of the foregoing problems in the prior art, the present invention provides a vehicular brake system for generating a brake force by efficiently utilizing brake pressure of a magnitude greater than normal pressure levels.

A first aspect of the present invention provides a vehicular brake system which includes a brake pressure generating unit, a first fluid line, a second fluid line, first wheel brake force generating units, second wheel brake force generating units and a first pressure increasing unit. The brake pressure generating unit is capable of generating a first brake pressure. The first fluid line couples a first wheel and a second wheel of the vehicle with the brake pressure generating unit. The second fluid line couples a third wheel and a fourth wheel of the vehicle with the brake pressure generating unit. The second fluid line has a second fluid line pressure which is in accordance with the first brake pressure. The first wheel brake force generating units are coupled to the first wheel and the second wheel. The first wheel brake force generating units generate a first brake force in the first wheel and the second wheel based on a first fluid line pressure of the first fluid line. The second wheel brake force generating units are coupled to the third wheel and the fourth wheel. The second wheel brake force generating units generate a second brake force in the third wheel and the fourth wheel based on the second fluid line pressure of the second fluid line. The first pressure increasing unit is for increasing the first brake force generated by the first wheel brake force generating units in the first wheel and the second wheel by adjusting the first fluid line pressure to exceed the first brake pressure generated by the brake pressure generating unit so that there is a difference between the first fluid line pressure and the second fluid line pressure.

In this way, with first pressure increasing unit increasing pressure in the first fluid line, the first wheel brake force generating units generate a brake force which is greater than a brake force corresponding to, for example, depression of a brake pedal and which assures reliable brake operation of the vehicle. Also, when the front left and right wheels of the vehicle are set as the first and second wheels, respectively, and the rear left and right wheels are set as the third and fourth wheels, respectively, there is assurance of stable vehicle operations even if load transfer occurs during brake operations because the rear wheels will never look before the front wheels lock. This is due to the fact that the first fluid line pressure is increased to exceed both the first brake pressure and the second fluid line pressure.

Preferably, the brake system has a second pressure adjusting unit that adjusts the second brake force generated by the second wheel brake force generating units in the third wheel and the fourth wheel by adjusting the second fluid line pressure to be no more than the first brake pressure generated by the brake pressure generating unit.

Preferably, the first pressure increasing unit adjusts the first fluid line pressure by drawing brake fluid from the brake pressure generating unit and supplying brake fluid drawn from the brake pressure generating unit to the first fluid line when the brake pressure generating unit is generating the first brake pressure.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Figure 1:
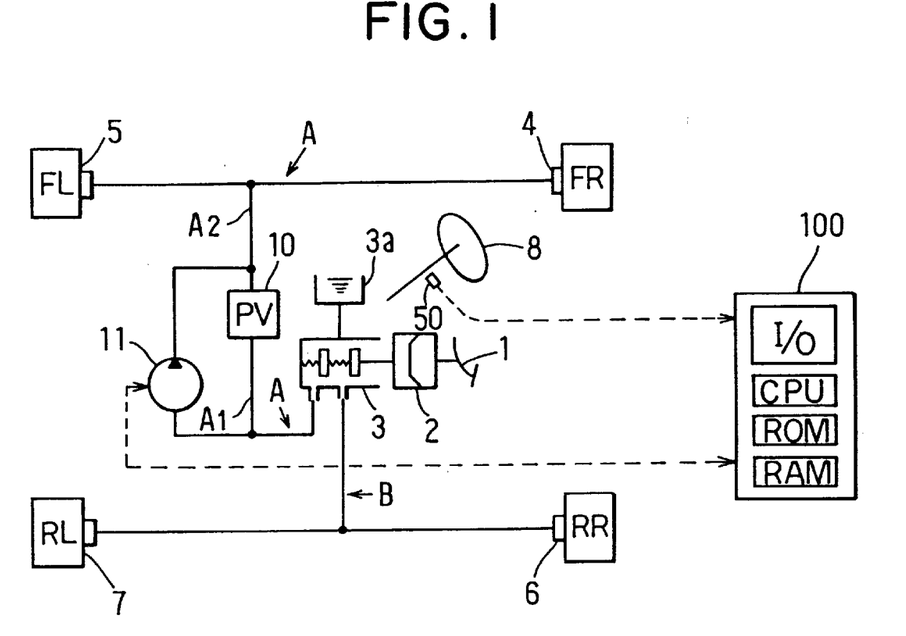
FIG. 1 is a schematic diagram of a brake system for a vehicle according to a first embodiment of the present invention.

Preferred embodiments of the present invention are described hereinafter with reference to the accompanying drawings. FIG. 1 shows a brake fluid line configuration (hereinafter referred to as fluid line) of a brake system according to a first embodiment of the present invention. In the present embodiment, a brake system in a four wheel vehicle is applied to front and rear fluid lines of front left and right wheels and rear left and right wheels, respectively.

As shown in FIG. 1, a brake pedal 1 depressed by a driver is coupled to a booster 2. Depression force and pedal stroke applied to the brake pedal 1 is transmitted to the booster 2.

The booster 2 has, at least, a first chamber and a second chamber, wherein the pressure of the first chamber is set to atmospheric pressure while the pressure of the second chamber is set to a negative pressure. The negative pressure of the second chamber may be set to a negative intake manifold engine pressure or a negative vacuum pressure. The booster 2 directly boosts a depression force or a pedal stroke applied by the driver to the brake pedal 1 based on a difference between the atmospheric pressure and the negative pressure. The booster 2 has a push rod for transmitting the boosted depression force or pedal stroke to a master cylinder 3. The master cylinder 3 generates a master cylinder pressure when the push rod of the booster 2 pushes its master piston. The master cylinder 3 is coupled to a master reservoir 3a which supplies brake fluid to the master cylinder 3 and which stores excess brake fluid from the master cylinder 3. In this way, a vehicle is usually equipped with the brake pedal 1, the booster 2, the master cylinder 3 and the like which form a brake pressure generating unit for applying a brake force.

A first fluid line A, which extends from the master cylinder 3, branches out with each end respectively connected to a first wheel cylinder 4, which is coupled to a front right wheel FR of the vehicle to provide pressure to the same wheel FR, and to a second wheel cylinder 5 which is coupled to a front left wheel FL of the vehicle to provide pressure on the same wheel FL. The first wheel cylinder 4 and the second wheel cylinder 5 form first wheel brake force generating units. A proportional control valve 10 is inversely provided along the first fluid line A from the master cylinder 3 towards the branched portion of the same fluid line A. A pump 11 is provided in parallel with this proportional control valve 10 for drawing brake fluid from the master cylinder 3 and for pumping the brake fluid towards the first and second wheel cylinders 4 and 5. The proportional control valve 10 and the pump 11 together form a pressure increasing unit for increasing brake pressure applied to the first and second wheel cylinders 4 and 5. The proportional control valve 10 and the pump 11 divide the first fluid line A into two portions. That is, the first fluid line A is divided into two portions which are, namely, a first pipe member A1, which extends from the master cylinder 3 up to the pressure increasing unit and which receives pressure (that is, brake fluid) from the master cylinder 3, and a second pipe member A2 which extends from the pressure increasing unit up to the first and second wheel cylinders 4 and 5.

A second fluid line B is provided between the master cylinder 3 and a third wheel cylinder 6 and a fourth wheel cylinder 7. The third wheel cylinder 6 is coupled to a rear right wheel RR of the vehicle to apply a brake force on the same wheel RR. On the other hand, the fourth wheel cylinder 7 is coupled to a rear left wheel RL of the vehicle to apply a brake force on the same wheel RL. The second fluid line B includes a fluid line member which communicates between the third wheel cylinder 6 and the fourth wheel cylinder 7. The third wheel cylinder 6 and the fourth wheel cylinder 7 form second wheel brake force generating units which receive pressure (which is also referred to as a first brake pressure) generated by the master cylinder 3 due to the depression of the brake pedal 1 by the driver to generate a predetermined brake force.

The operation of the pressure increasing unit formed by the proportional control valve 10 and the pump 11 is explained hereinafter. When the brake pedal 1 is depressed and a master cylinder pressure PU is exerted to the first fluid line A, the pressure increasing unit moves brake fluid from the first pipe member A1 to the second pipe member A2 to set the pressure inside the second pipe member A2 to a second brake pressure PL that is higher than the master cylinder pressure PU. The pressure increasing unit also maintains pressure inside the second pipe member A2 at the second brake pressure PL level.

During this time, when the master cylinder 3 is generating the master cylinder pressure PU, the pump 11, which is parallel to the proportional control valve 10 and connected to the first fluid line A, draws brake fluid from the first pipe member A1 and moves the brake fluid to the second pipe member A2. In this way, the pump 11 transports brake fluid from the first pipe member A1 towards the second pipe member A2. A plunger pump, which is commonly used in anti-skid brake control systems, may be used as the pump 11. With the pump 11 moving brake fluid from the first pipe member A1 side to the second pipe member A2 side and, as will be explained later, the proportional valve 10 maintaining the pressure inside the second pipe member A2, the pressure inside the second pipe member A2 can be set to the second brake pressure PL level which is greater than the first brake pressure level, that is, the master cylinder pressure PU level.

Meanwhile, the pump 11 may be actuated when the master cylinder 3 is generating master cylinder pressure PU or, for example, be driven in accordance with the brake pedal depression, brake pedal stroke, master cylinder pressure magnitude or the like. In other words, the brake pressure applied to the first wheel cylinder 4 and the second wheel cylinder 5 is increased when the pump 11 is driven with the conditions for driving the pump 11 being set arbitrarily.

When the pump 11 is actuated, the same pump 11 transports brake fluid from the first pipe member A1 towards the second pipe member A2 and the pressure inside the second pipe member A2 is at the second brake pressure level PL, which is greater than the master cylinder pressure PU, the proportional control valve 10 acts to maintain the pressure difference (=PL−PU) between the two pressure levels. In other words, when releasing brake fluid towards the master cylinder 3, the proportional control valve 10 reduces the pressure PL based on a predetermined attenuation ratio so that there is a pressure difference between the second brake pressure FL and the master cylinder pressure PU. When the pressure in the master cylinder 3 decreases after the driver stops depressing the brake pedal 1, it is preferable to return brake fluid, which applies the second brake pressure PL to the first and second wheel cylinders 4 and 5, to the master cylinder 3 to prevent dragging during brake operations. In this way, with the use of the proportional control valve 10, when the master cylinder pressure PU becomes no more than a turning point pressure level set for the proportional control valve 10, the proportional control valve 10 stops maintaining the pressure at the second brake pressure PL level and thus, pressure in the first wheel cylinder 4 and the second wheel cylinder 5 becomes substantially the same as the brake pressure generated by the master cylinder 3. In other words, when the master cylinder pressure PU becomes no more than the turning point pressure level of the proportional control valve 10, because the proportional control valve 10 stops reducing the pressure of brake fluid when moving brake fluid from the second pipe member A2 to the first pipe member A1, the pressure of the first and second wheel cylinders 4 and 5 becomes equal to the master cylinder pressure PU.

Meanwhile, when the pump 11 is not being driven, brake fluid having the master cylinder pressure PU of the master cylinder 3 can be supplied via the proportional control valve 10 to each of the first and second wheel cylinders 4 and 5 so that the master cylinder pressure PU can be applied to both first and second wheel cylinders 4 and 5. In other words, the movement of brake fluid from the first pipe member A1 towards the second pipe member A2 is opposite the orientation of the connection of the proportional control valve 10 and thus, in this case, the proportional control valve 10 does not perform any pressure reduction operation with brake fluid flowing from the first pipe member A1 towards the second pipe member A2 without any decline in pressure. With the use of the proportional control valve 10 as a member for maintaining pressure, even if the brake pressure applied to the first and second wheel cylinders 4 and 5 cannot be increased because of, for example, operational malfunctions in the pump 11, the proportional control valve 10 serves as a fail-safe mechanism for assuring that the brake pressure applied to the wheel cylinders 4 and 5 can at least be maintained at the level of the master cylinder pressure PU.

It must be noted here that there is no need to be limited to the use of the proportional control valve 10 for maintaining the pressure difference between the master cylinder pressure and the second brake pressure. For example, a two-position valve may be used in place of the proportional control valve 10. That is, using the two-position valve which can be switched to a cut-off position for preventing movement of brake fluid between the first pipe member A1 and the second pipe member A2 and to a communicable position for allowing such movement of brake fluid, the two-position valve can be set to a cut-off position to maintain the pressure difference between the pressure in the wheel cylinders and pressure of the master cylinder. This prevents dragging in the brake operation by allowing the return of brake fluid to the master cylinder 3 through switching of the two-position valve from the cut-off position to the communicable position when the brake pedal 1 is detected to be not depressed based on the output of a commonly known brake switch or the like.

The operation and effects of the pressure increasing unit are described hereinafter. As described above, the pressure increasing unit begins operating upon actuation of the pump 11 when the master cylinder 3 is generating pressure during vehicle braking operation. Here, the pressure increasing unit moves brake fluid from the first pipe member A1 towards the second pipe member A2. Accordingly, because the pressure in the master cylinder 3 decreases when the driver depresses the brake pedal 1, reaction force from the brake pedal 1 in opposition of the depression of the brake pedal 1 becomes smaller compared to that of conventional devices in which the magnitude of the reaction force from the brake pedal 1 is proportional to the pedal stroke. In this way, the pedal depression force exerted by the driver does not yield to the pedal reaction force from the brake pedal 1 and therefore, the driver can depress the brake pedal 1 to set the adhesion between the vehicle wheels and the road surface to a maximum. In this case, when the driver again strongly depresses the brake pedal 1, the master cylinder pressure PU decreases in accordance with the depression of the brake pedal 1 and thus, reaction force from the brake pedal 1 further decreases. If the above operations are observed over a period of time, it can be seen that the rate of increase of the master cylinder pressure PU generated by the master cylinder 3 decreases with respect to the amount of depression of the brake pedal 1. In this way, with the reduction in the rate of increase in the magnitude of the reaction force from the brake pedal 1, the driver needs much less effort in braking. Also, with the curb in the increase in the pressure PU of the master cylinder, the load and stress applied to the master cylinder 3 itself can be reduced.

With the movement of brake fluid towards the second pipe member A2 from the first pipe member A1 which results in the reduction of the master cylinder pressure PU, the brake pressure inside the second pipe member A2 is set to the second brake pressure level PL which is higher than the master cylinder pressure PU. Pressure applied to the first and second wheel cylinders 4 and 5 increases because the proportional control valve 10 maintains the pressure difference between the second brake pressure level PL inside the second pipe member A2 and the master cylinder pressure PU. That is, the pressure PL applied to the first and second wheel cylinders 4 and 5 increases at a rate faster than the rate of increase of the master cylinder pressure PU, and thus, large wheel brake forces can be generated by the first and second wheel cylinders 4 and 5.

In this way, the pressure increasing unit effectively lessens the amount of depression force the driver needs to exert on the brake pedal 1 while facilitating the generation of a large amount of brake force in the first and second wheel cylinders 4 and 5. That is, the rate of increase in the master cylinder pressure PU with respect to the depression of the brake pedal 1 by the driver decreases while the amount of increase in the wheel cylinder pressure PL increases with respect to the increase in the master cylinder pressure PU. Accordingly, compared with the brake force generated by directly applying the master cylinder pressure PU to each of the wheel cylinders 4 and 5, a large wheel braking force can be obtained with lesser pedal depression in the brake pedal 1.

In addition, because the pressure increasing unit is provided along the first fluid line A that connects to the wheel cylinders 4 and 5, there is no need for additional any device compared to such arrangements as generating a large braking force in the master cylinder 3 itself so that the brake force increases at a higher rate than the depression of the brake pedal 1, increasing the boost rate of the booster 2 or the like. The pressure increasing unit of the present invention is made up of an inversely connected proportional control valve, a pump provided in parallel with the proportional control valve and a fluid line which all function together as a fail-safe mechanism for the brake system.

Meanwhile, because boosting of the pressure of the second pipe member A2 is performed using the brake fluid inside the first pipe member A1, the amount of brake fluid returned to the master cylinder 3 from the first fluid line A when the driver stops depressing the brake pedal 1 and releases the brake pedal 1 is equal to the amount of brake fluid provided to the first fluid line A from the master cylinder 3. In this way, brake fluid can be returned to the master cylinder 3 without straining the master cylinder 3.

Also, in the present embodiment, while the pressure increasing unit is provided in only in the first fluid line A, burden on the driver can still be lessened even with a two master cylinder-type system because the amount of brake fluid in one of the master cylinders can be reduced.

Control of the pressure increasing unit with respect to the actuation of the pump 11 is explained hereinafter. With the operation of the pressure increasing unit, differing brake pressures in the first and second fluid lines A and B can be obtained. That is, when the brake pressures applied to the first and second wheel cylinders 4 and 5 and the third and fourth wheel cylinders 6 and 7 are made to be different from each other, there will be a difference in the brake forces of the front wheels and the rear wheels.

Meanwhile, the operation of the pump 11 is controlled by an electronic controller 100. This electronic controller 100 is a microprocessor which includes a CPU, ROM, RAM, I/O interface and the like. The electronic controller 100 receives a signal from a steering sensor 50, which is coupled to a steering wheel 8 that is turned by the driver. Based on a processing result of the signal from the steering sensor 50, the electronic controller 100 sends a predetermined control signal to the pump 1 for driving the same pump 1. The steering sensor 50 is one example of a sensor used for detecting movement of the vehicle due to operations by the driver.

Figure 3:
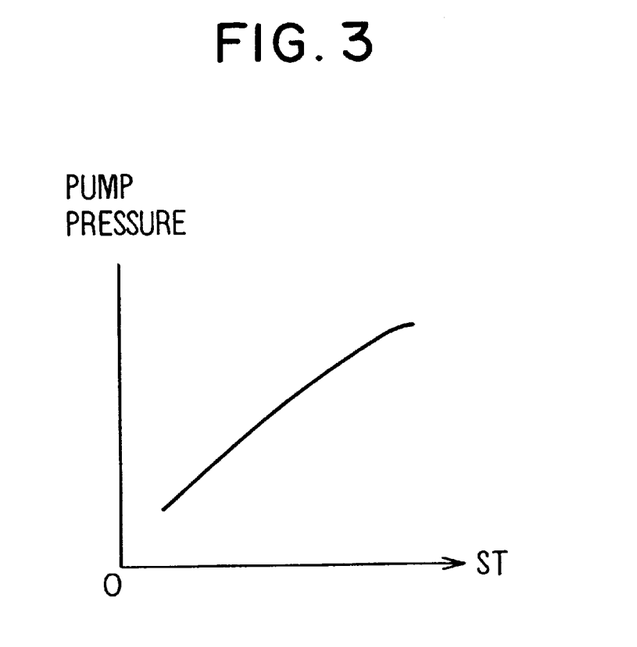
FIG. 3 is a graph showing the relationship of pressure generated by a pump of the brake system with a steering angle of the vehicle.
Figure 4:
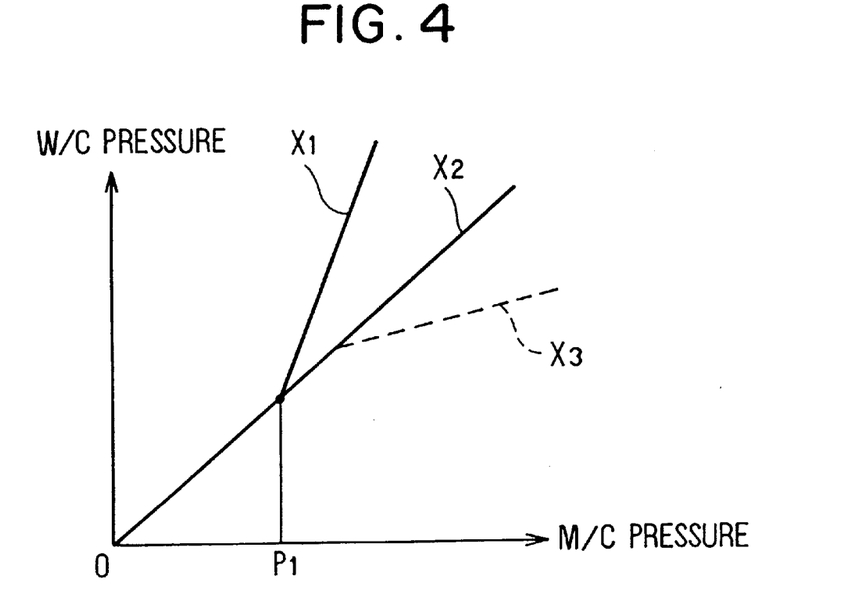
FIG. 4 is a graph showing the relationship of wheel cylinder pressures with master cylinder pressure in the brake system according to the first embodiment.

The provision of the pressure difference between the fluid lines A and B which is provided with the actuation of the pressure increasing unit is explained with reference to FIGS. 2–4.

Figure 2:
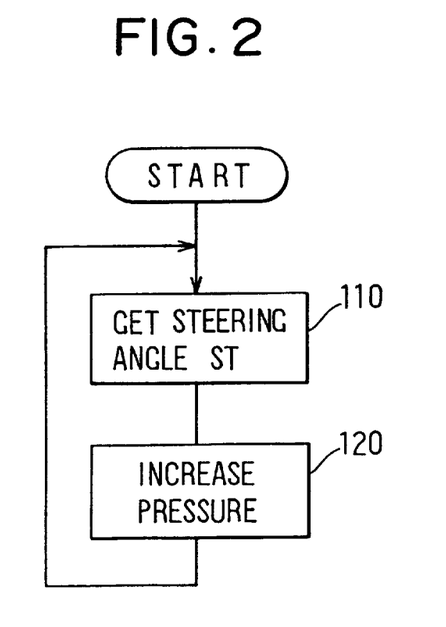
FIG. 2 is a flowchart of a process for increasing brake pressure.

The process shown by the flowchart of FIG. 2 is executed, for example, when the driver actuates an ignition switch of the vehicle or the like. In this process, step 110 detects a steering angle ST in accordance with the steering operation on the vehicle by the driver based on a detection signal from the steering sensor 50. Subsequent step 120 increases the pressure applied on the first and second wheel cylinders 4 and 5 based on the steering angle ST. One example of a pattern for increasing the pressure applied to the first and second wheel cylinders 4 and 5 is shown in FIG. 3. Here, frequency of operation of the pump 11, that is, discharge capacity of the pump 11 is adjusted to vary the amount of increase in the pressure applied to the first and second wheel cylinders 4 and 5 based on the steering angle ST.

Normally, sudden vehicle braking operations are accompanied by the driver's turning the steering wheel at larger and sharper steering angles ST. During such braking operations, understeering results when the front wheels do not generate large lateral reaction forces (side forces) and thus, the vehicle may not turn and, instead, may go straight ahead in defiance of the driver's intentions. Accordingly, when the steering angle ST is large, the side forces generated by the vehicle wheels can be increased by substantially increasing the pressure applied to the first and second wheel cylinders 4 and 5 to obtain large braking forces. In this way, if the side forces are increased, a large yaw rate can be obtained for the vehicle and thus, the vehicle can stop without any loss in its steering characteristics. That is, according to the present invention, if large braking forces are generated in the front wheels, which generate side forces during vehicle steering, by driving the pressure increasing unit in accordance with the steering angle ST, the vehicle can make a turn while keeping its brake characteristics stable.

Because the pressure increasing unit formed by the proportional control valve 10 and the pump 11 is provided only in the first fluid line A for the first and second wheel cylinders 4 and 5 of the front wheels, the pressure applied to the third and fourth wheel cylinders 6 and 7 of the rear wheels is equal to the master cylinder pressure PU. For example, as shown in FIG. 4, when the pressure applied to the first and second wheel cylinders 4 and 5 becomes no less than a turning point pressure P1 of the proportional control valve 10, the pressure applied to the first and second wheel cylinders 4 and 5 is increased with respect to the master cylinder PU following a line X1. On the other hand, the pressure applied to the third and fourth wheel cylinders 6 and 7, which is indicated by a line X2, is substantially the same as the master cylinder pressure PU. Accordingly, there will be a difference between the brake forces generated by the first and second wheel cylinders 4 and 5 of the front wheels and the brake forces generated by the third and fourth wheel cylinders 6 and 7 of the rear wheels.

Accordingly, by providing such difference between the pressure applied to the front wheels and the pressure applied to the rear wheels, when the vehicle wheels have a tendency to lock, such locking will take place at the front wheels. In this way, the vehicle can be prevented from spinning or any other unstable maneuvering condition. Because the brake forces generated by the front wheels and the brake forces generated by the rear wheels can be set in accordance with an ideal brake force distribution of the vehicle wheels, stability in the vehicle chassis can be ensured. In this case, with the pressure increasing unit building up the second pressure PL, which is greater than the master cylinder pressure PU generated when the brake pedal 1 is depressed by the driver, and the distribution of brake forces between the front and the rear wheels being set such that the pressures applied to the wheel cylinders 4 and 5 are greater than the master cylinder pressure PU, there will be no energy loss with respect to the master cylinder pressure PU generated by the depression of the brake pedal 1.

It must be noted that the well-known proportional control valve may be provided in the second fuel line B with brake fluid being provided from the master cylinder 3 towards the third and fourth wheel cylinders 6 and 7 in such a way that the pressure of third and fourth wheel cylinders 6 and 7 is set to be smaller by a predetermined attenuation ratio compared to the master cylinder pressure PU. In this case, when the master cylinder pressure PU becomes no less than a turning point pressure of the proportional control valve connected to the third and fourth wheel cylinders 6 and 7 of the rear wheels, the pressure applied to the wheel cylinders 6 and 7 of the rear wheels is set based on the dashed line X3 of FIG. 4. In this way, there will be a substantial difference in pressure between the pressure applied to the first and second wheel cylinders 4 and 5 of the front wheels and the pressure applied to the third and fourth wheel cylinders 6 and 7 of the rear wheels. It must be noted that the pressure applied to the first and second wheel cylinders 4 and 5 of the front wheels is set higher than the master cylinder pressure PU. This assures the generation of a significant amount of braking force for the vehicle. Also, the gradient for increasing the pressure PL applied to the first and second wheel cylinders 4 and 5 of the front wheels is set to a large value as shown by line X1 in FIG. 4. Thus, even if the commonly known proportional control valve is provided to the third and fourth wheel cylinders 6 and 7 of the rear wheels, the attenuation ratio of the proportioning control valve can be set to a very small value so that the difference between the braking forces generated by the front wheels and the rear wheels can be set ideally. In this way, there is no loss of energy even if the proportional control valve is provided for the rear wheels. In other words, losses in the master cylinder pressure PU, which is generated through the depression of the brake pedal by the driver, can be minimized.

Variations on the first embodiment of the present invention are described hereinafter. While the difference between the pressure applied to the first and second wheel cylinders 4 and 5 of the front wheels and the pressure applied to the third and fourth wheel cylinders 6 and 7 of the rear wheels is adjusted based on the output of the steering sensor 50 in the foregoing first embodiment, one variation of such arrangement would be to adjust such difference in applied pressures based on an output from wheel speed sensors (which are not shown in FIG. 1). That is, wheel speed sensors may be provided in the front left and right wheels and rear left and right wheels, respectively, with the pressure increasing unit being driven to eliminate the difference in wheel speeds between wheel speeds of the front wheels and the rear wheels.

In other words, the pressure increasing unit may be driven to increase the pressure applied on the first and second wheel cylinders 4 and 5 of the first fluid line A so that the reaction forces applied by the road surface on the front wheels and the rear wheels are uniform. That is, as load transfer in the vehicle chassis towards the front wheels becomes more intense with greater deceleration rates, the reaction force applied by the road surface on the front wheels increases while the reaction force applied by the road surface on the rear wheels decreases. This situation can be observed based on the wheel speeds wherein the decline in the wheel speeds of the front wheels, which are receiving a significant amount of reaction force from the road surface, is small while the decline in the wheel speeds of the rear wheels, which are receiving a reduced amount of reaction force from the road surface, increases. In this way, the reaction force applied by the road surface on the wheels can be observed based on the wheel speeds. In this arrangement, the reaction force applied on each of the wheels may be estimated based by taking into account the average wheel speed of the front left and right wheels and the average wheel speed of the rear left and right wheels.

When driving the pressure increasing unit of the first fluid line A based on the wheel speeds of each of the vehicle wheels, for example, discharge capacity of the pump 11 of the pressure increasing unit may be increased when the wheel speed of the rear wheels is greater than the wheel speed of the front wheels to increase the rate for increasing the pressure applied to the first and second wheel cylinders 4 and 5 of the front wheels. Accordingly, pressure applied to the first and second wheel cylinders 4 and 5 of the first fluid line A increases. Load transfer towards the front wheels is promoted while increasing the difference between the pressure applied to the first and second wheel cylinders 4 and 5 of the front wheels and the pressure applied to the third and fourth wheel cylinders 6 and 7 of second fluid line B. With lesser reaction force applied by the road surface due to load transfer towards the front wheels, the pressure applied on the third and fourth wheel cylinders 6 and 7 of the rear wheels is set based on such reduced reaction force and, thus, an ideal distribution of load between the front and rear wheels can be achieved which promotes the stability in vehicle movements. Also, because the pressure applied to the first and second wheel cylinders 4 and 5 of the front wheels are increased furthermore in comparison with the master cylinder pressure PU, brake forces generated by wheel cylinders 4 and 5 also increases. In this way, adjustment of the pressure difference between the pressure applied to the first and second wheel cylinders 4 and 5 of the front wheels and the pressure applied to the third and fourth wheel cylinders 6 and 7 of the rear wheels to make the reaction force applied by the road surface to each of the wheels uniform and adjustment of the same pressure difference to increase the pressure applied to the wheel cylinders 4 and 5 of the front wheels is performed to increase the stability in vehicle movement as well as increase the generated brake force of the front wheels.

Meanwhile, when the wheel speed of the rear wheels is smaller compared to the wheel speed of the front wheels, the discharge capacity of the pump 11 is reduced and the pressure difference between the pressure applied to the first and second wheel cylinders 4 and 5 of the front wheels and the pressure applied to the third and fourth wheel cylinders 6 and 7 of the rear wheels is also reduced. Here, the reaction force applied by the road surface on the wheels can be averaged by reducing the pressure applied to the first and second wheel cylinders 4 and 5 and by reducing the amount of load transfer towards the front wheels. In this way, locking of the rear wheels before such locking in the front wheels can be avoided to ensure stable vehicle movement during braking operations.

Thus, the provision of a pressure difference between the pressures applied to the front and rear wheels for making the reaction forces applied by the road surface on the front and rear wheels equal results in better and more stable braking operations.

Also, while the driving of the pump 11 is performed in the foregoing embodiment and its variation based on the detected signal from the steering sensor 50 or the wheel speed sensors, there is no need to limited to these types of arrangements. For example, the application of brake forces on the vehicle may be detected based on a signal from a conventional brake switch, which actuates a brake lamp, or the like. When braking operation is being performed, the pump 11 of the pressure increasing unit may be driven at a constant rate so that the pressure applied to the first and second wheel cylinders 4 and 5 of the front wheels increases at a constant rate. Because the pressure applied to the first and second wheel cylinders 4 and 5 is set higher than the master cylinder pressure PU for this arrangement, a pressure difference between the pressures applied to the first and second wheel cylinders 4 and 5 and the third and fourth wheel cylinders 6 and 7 can be provided while setting the pressures applied to the wheel cylinders 4–7 to be more than the master cylinder pressure PU.

Figure 5:
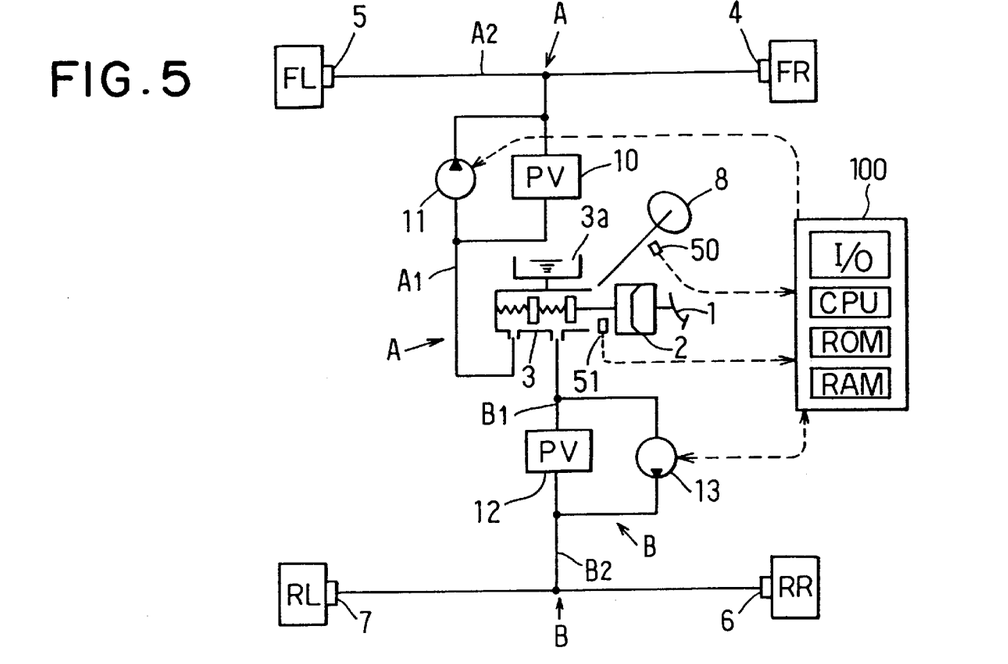
FIG. 5 is a schematic diagram of the brake system according to a second embodiment of the present invention.

A second embodiment of the present invention is explained hereinafter with reference to FIG. 5. FIG. 5 shows a fluid line arrangement in which the pressure increasing unit, which is provided in the first fluid line A of the brake system according to the first embodiment, is also provided in the second fluid line B. Parts and units shown in FIG. 5 that are the same as those of the first embodiment are designated by the same reference numerals used in FIG. 1. Explanation of the details and effects of such similar parts and units is omitted here.

As shown in FIG. 5, the second fluid line B, which connects the master cylinder 3 with the third and fourth wheel cylinders 6 and 7 of the rear wheels, is provided with a proportional control valve 12 similar to the proportional control valve 10 of the first fluid line A. The proportional control valve 12 is inversely connected along the second fluid line B and is parallel with a pump 13. Thus, the second fluid line B is provided with its own pressure increasing unit which is formed by the proportional control valve 12 and the pump 13. The second fluid line B is divided into two parts: namely, a first pipe member B1 which extends from the master cylinder 3 up to the proportional control valve 12 and an intake side of the pump 13, and a second pipe member B2 which extends from the proportional control valve 12 and a discharge side of the pump 13 up to the third and fourth wheel cylinders 6 and 7.

Figure 6:
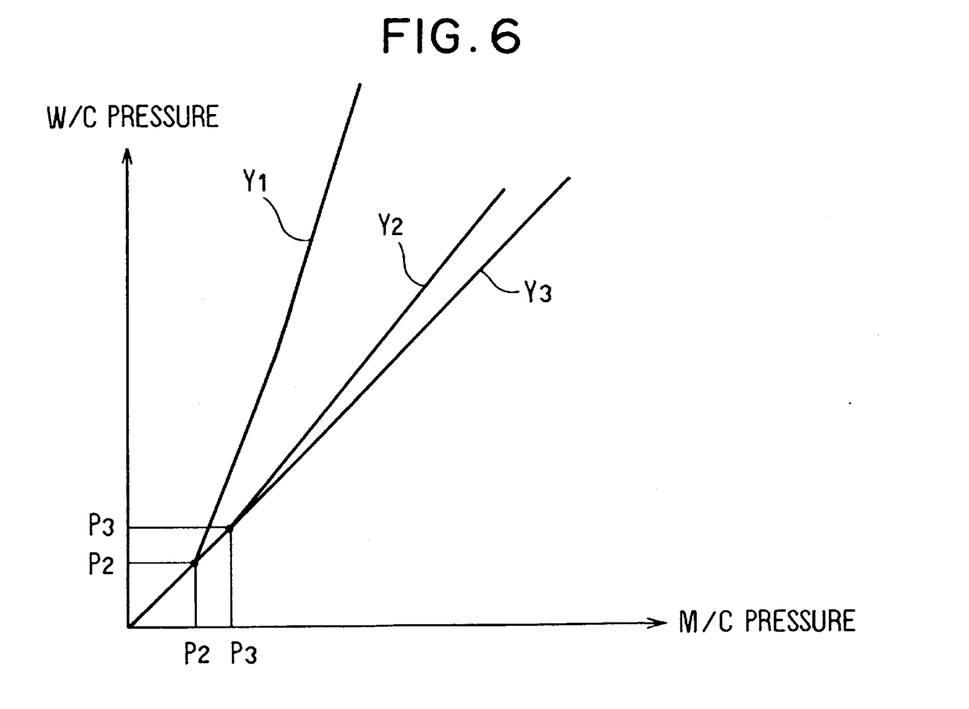
FIG. 6 is a graph showing the relationship of wheel cylinder pressures with master cylinder pressure in the brake system according to the second embodiment.
Figure 7:
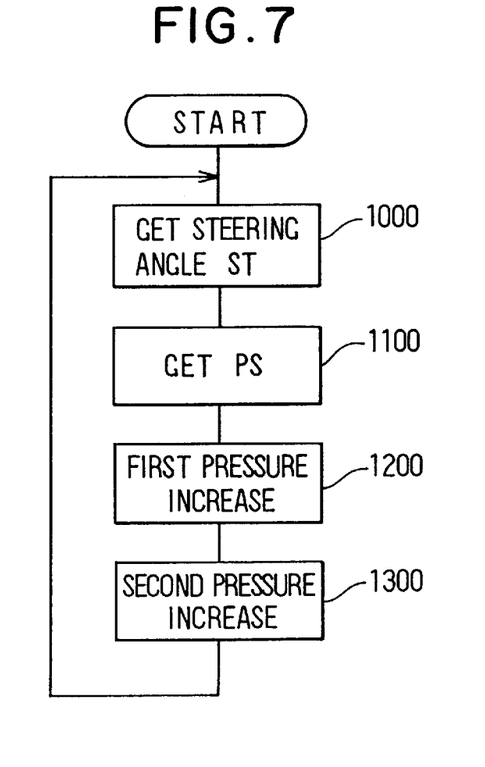
FIG. 7 is a flowchart of the process for increasing brake pressure according to the second embodiment.

Here, proportional control valves 10 and 12, which have the characteristics shown in FIG. 6, are provided in the first and second fluid lines A and B, respectively, whose constructions have been discussed above. That is, the proportional control valve 10 provided in the first fluid line A has characteristics indicated by line Y1 in FIG. 6 while the proportional control valve provided for the second fluid line B has characteristics indicated by line Y2 in the same FIG. 6. Line Y3 of FIG. 6 indicates the direct transmission of the master cylinder pressure PU to the wheel cylinders.

In the present embodiment, the actuation of the pumps 11 and 13, which have substantially the same brake fluid intake and discharge capacities, may be started at the same time as the start of braking operations of the vehicle by the driver through the depression of the brake pedal 1 as indicated by a signal from, for example, a pedal stroke sensor 51. One other arrangement might be to start the driving of the pumps 11 and 13 when the master cylinder pressure PU becomes no less than a turning point pressure P2 as detected by a pressure sensor (not shown).

As shown in FIG. 6, the turning point pressure P2 of the proportional control valve 10 provided in the first fluid line A is set lower than a turning point pressure P3 of the proportional control valve 12 provided in the second fluid line B. The turning point pressure P2 of the proportional control valve 10 may be set to the master cylinder pressure PU generated by the master cylinder 3 in response to a depression of the brake pedal 1 by the driver for moderately slowing down the speed of the vehicle. With turning point pressures P2 and P3 set for the proportional control valves 10 and 12, respectively, if the master cylinder pressure PU becomes no less than the turning point pressure P2 and no more than the turning point pressure P3, the second brake pressure in the wheel cylinders 4 and 5 boosted by the intake of brake fluid from the master cylinder 3 is maintained by the proportional control valve 10 of the first fluid line A while the proportional control valve 12 of the second fluid line does not perform any pressure maintenance function. In this way, there is a difference between the brake pressure applied to the first and second wheel cylinders 4 and 5 and the brake pressure applied to the third and fourth wheel cylinders 6 and 7. Because the pressure applied to the first and second wheel cylinders 4 and 5 is boosted to exceed the master cylinder pressure PU, a significant amount of braking force is generated in the front wheels. In addition, because pressure applied to the first and second wheel cylinders 4 and 5 is boosted by transporting brake fluid from the first pipe member A1 towards the second pipe member A2, the driver needs less effort in depressing the brake pedal 1.

Moreover, when the master cylinder pressure PU exceeds the pressure turning point P3, the second pressure increasing unit of the second fluid line B boosts the pressure applied to the third and fourth wheel cylinders 6 and 7 of the rear wheels. Here, the proportional control valve 10 of the first fluid line A boosts the pressure applied to the first and second wheel cylinders 4 and 5 at a rate faster than the rate the proportional control valve 12 boosts the pressure applied to the third and fourth wheel cylinders 6 and 7. That is, the attenuation ratio for the first fluid line A when moving brake fluid from the second pipe member A2 (whose pressure is boosted by the pump 11) towards the first pipe member A1, which is set to the master cylinder pressure PU, is greater than the attenuation ratio for the second fluid line B when moving brake fluid from the second pipe member B2 (whose pressure is boosted by the pump 13) towards the first pipe member B1 whose pressure is equal to the master cylinder pressure PU. Therefore, even if the master cylinder pressure PU becomes greater than the turning point pressure P3, there will still be a predetermined brake pressure difference between the pressure applied to the first and second wheel cylinders 4 and 5 and the pressure applied to the third and fourth wheel cylinders 6 and 7. In this case, both first and second fluid lines A and B ease the burden on the driver for depressing the brake pedal 1 and because the pressure applied to the wheel cylinders 4 and 5 of the front wheels and the pressure applied to the wheel cylinders 6 and 7 are both boosted, thus enhancing and making more effective the braking operations of the vehicle.

Variations on the foregoing second embodiment are described hereinafter with reference to FIGS. 7–11. In the foregoing second embodiment, the pump 11 provided in the first fluid line A and the pump 13 provided in the second fluid line B are driven such that their brake fluid intake and discharge capacities are set in accordance with predetermined conditions. One variation of the second embodiment executes the process shown by the flowchart of FIG. 7 when the ignition switch or the like is actuated. In this process, step 1000 computes the steering angle ST based on a detection signal from the steering sensor 50. Subsequent step 1100 detects a pedal stroke PS based on a signal from the pedal stroke sensor 51. Step 1200 actuates the first pressure increasing unit while step 1300 actuates the second pressure increasing unit. It must be noted that the first pressure increasing unit is provided in the first fluid line A and includes the pump 11 and the proportional control valve 10. On the other hand, the second pressure increasing unit is provided in the second fluid line B and includes the pump 13 and the proportional control valve 12.

Figure 8:
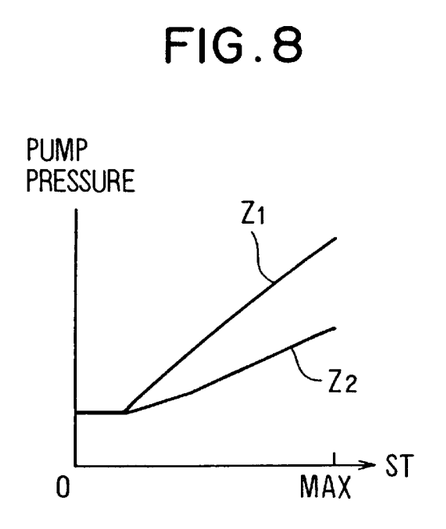
FIG. 8 is a graph showing the relationship of pump pressure with the steering angle.
Figure 9:
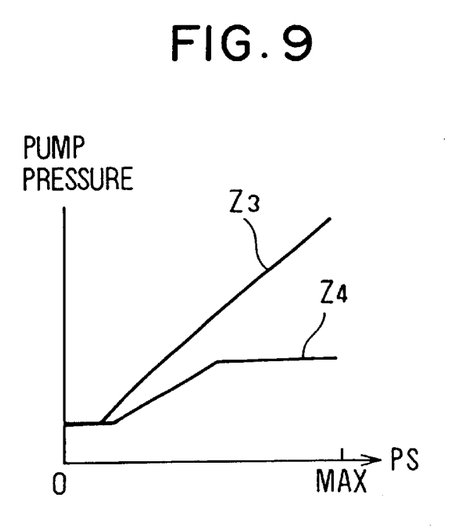
FIG. 9 is a graph showing the relationship of pump pressure with the amount of pedal depression.

In step 1200, the system actuates and drives the first pressure increasing unit based on maps shown by FIGS. 8 and 9. That is, as shown in FIG. 8, when the steering angle ST increases, the brake fluid intake and discharge capacity of the pump 11 of the first fluid line A is increased following the characteristic line Z1 to increase the flow of brake fluid from the first pipe member A1 to the second pipe member A2. Regarding the pump 13, with increasing steering angle ST, the brake fluid intake and discharge capacity of the pump 13 is increased following the characteristic line Z2 to increase the flow of brake fluid from the first pipe member B1 to the second pipe member B2. It must be noted that the brake fluid intake and discharge capacity of the pump 13 of the second fluid line B is lower than the brake fluid intake and discharge capacity of the pump 11 of the first fluid line A. The brake fluid intake and discharge capacities of the pumps 11 and 13 are increased, for example, by increasing the respective operation cycles of the pumps 11 and 13.

In addition, as shown by lines Z3 and Z4 of FIG. 9, with increasing pedal stroke PS, the fluid intake and discharge capacities of the pumps 11 and 13 of the first and second fluid lines A and B are increased to increase the flow of brake fluid from the first pipe member A1 to the second pipe member A2 and from the first pipe member B1 to the second pipe member B2, respectively. Here, as indicated by line Z4 of FIG. 9, the increase in the fluid intake and discharge capacity of the pump 13 of the second fluid line B of the rear wheels is curbed when the pedal stroke PS exceeds a predetermined level. Accordingly, the pumps 11 and 13 are controlled to increase the difference between the pressure applied to the wheel cylinders 4 and 5 of the front wheels and the pressure applied to the wheel cylinders 6 and 7 of the rear wheels. During normal braking operations of the vehicle, the deceleration of the vehicle becomes greater with increasing pedal stroke PS and, together with this, load transfer from the rear wheels to the front wheels becomes more intense. Thus, with the rear wheels having a tendency to rise up, the rear wheels will tend to lock at lower pressures than the front wheels. On the other hand, because the front wheels tend to receive greater reaction forces from the road surface due to load transfer, the front wheels need more pressure to generate higher braking forces. Because of the above considerations, the intake and discharge capacities of the pumps 11, 13 may be set to different values when the pedal stroke PS exceeds a predetermined level.

In aforementioned steps 1208 and 1300 and as shown in the maps of FIGS. 8 and 9, the intake and discharge capacities of the pump 11 of the first fluid line A and the pump 13 of the second fluid line B are set and controlled to drive the first pressure increasing unit of the first fluid line A and the second pressure increasing unit of the second fluid line B to provide a difference between the pressure applied to the first and second wheel cylinders 4 and 5 of the front wheels and the pressure applied to the third and fourth wheel cylinders 6 and 7 of the rear wheels. In this way, compared with the first embodiment, the second embodiment of the present invention further enables the adjustment of braking operations based on the operations by the driver and vehicle movement.

Figure 10:
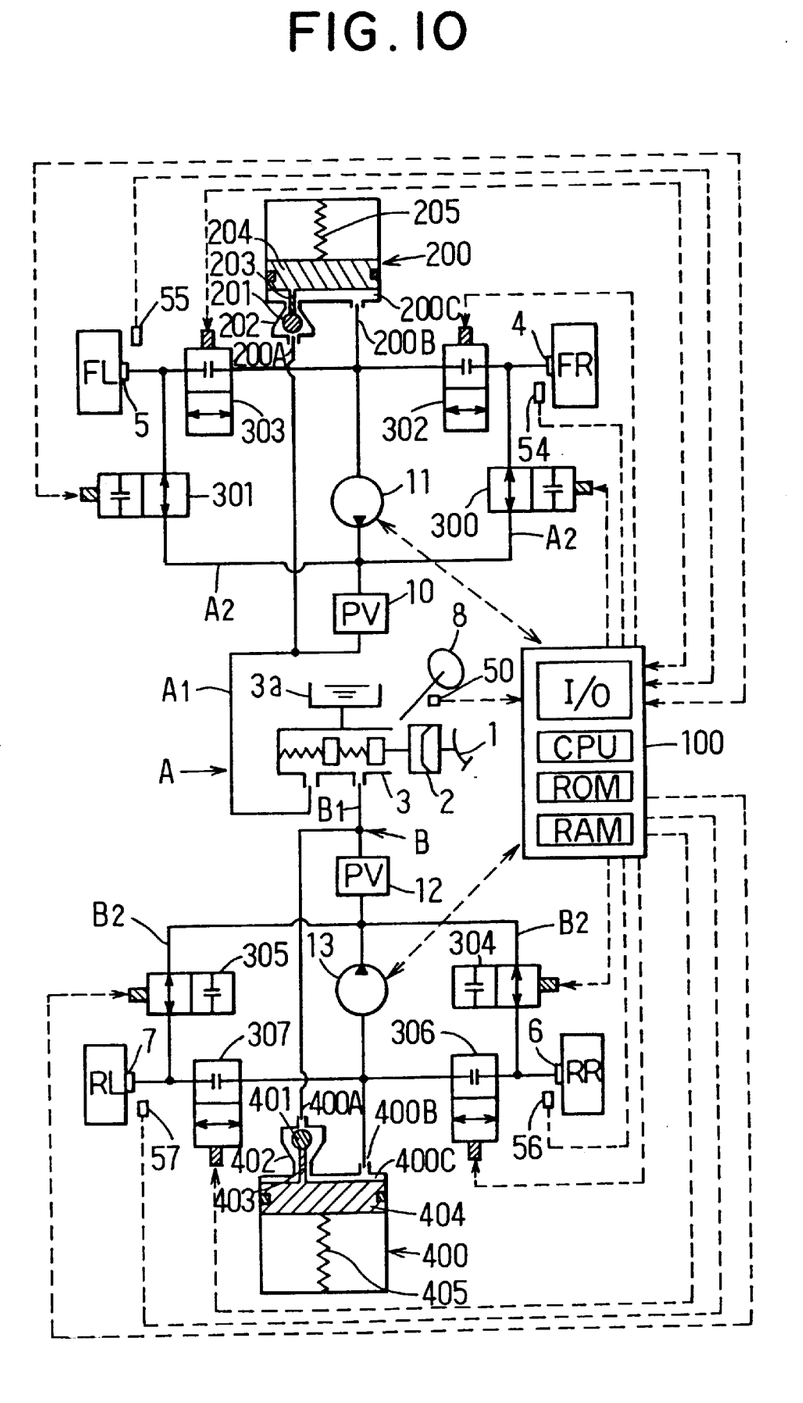
FIG. 10 is a schematic diagram of a brake system according to a third embodiment of the present invention.

Meanwhile, a third embodiment of the present invention is explained hereinafter with reference to FIG. 10. In the same way as the second embodiment, the brake system according to the third embodiment is provided with pressure increasing units for both first and second fluid lines A and B with a difference between the pressure applied to the first and second wheel cylinders 4 and 5 of the front wheels and the pressure applied to the third and fourth wheel cylinders 5 and 6 of the rear wheels being set in accordance with the adhesion conditions of the respective wheels with the road surface. Here, the adhesion conditions of the respective wheels with the road surface is estimated based on the slip conditions of the wheels. For example, the slip rate can be computed based on the vehicle wheel speeds calculated based on data from wheel speed sensors 54, 55, 56 and 57 provided for each wheel and the vehicle speed estimated from the wheel speeds.

The operation and effects of the brake system according to the third embodiment having the aforementioned construction are discussed hereinafter. Members and parts which are the same as those in the previous embodiments are designated with the same reference numerals. Also, the detailed description of such members and parts are omitted here. In addition, because the first fluid line A and the second fluid line B have the same construction, the explanation here will center on the first fluid line A while omitting detailed description of the second fluid line B.

In the same way as the first pressure increasing unit of the aforementioned second embodiment, the first pressure increasing unit of the first fluid line A includes the proportional control valve 10 and the pump 11. The pump 11 draws brake fluid from the first pipe member A1 and discharges the brake fluid towards the second pipe member A2 via a reservoir 200. In the same way as in the previously described embodiments, the pump 11 of the first pressure increasing unit of the first fluid line A and the pump 13 of the second pressure increasing unit of the second fluid line B are activated upon detection of the start of braking operations on the vehicle when the driver depresses the brake pedal 1.

The construction of the reservoir 200 is described in detail hereinafter. The reservoir 200 is disposed between the master cylinder 3 and the proportional control valve 10. The reservoir 200 has a first reservoir hole 200A through which brake fluid from the first pipe member A1, whose pressure is equal to the master cylinder pressure PU, passes through. A ball valve 201 is provided between the first reservoir hole 200A and an internal chamber 200C of the reservoir 200. A load 203, which has a predetermined stroke movement and which is for moving the ball valve 201 up and down, is provided inside the internal chamber 200C. A piston 204 that communicates with the load 203 is also provided inside the internal chamber 200C. The piston 204 moves in the direction for expanding the chamber 200C when brake fluid flows inside the chamber 200C from a second reservoir hole 200B to store the brake fluid inside the chamber 200C. When the amount of brake fluid stored in the chamber 200C exceeds the brake fluid amount corresponding to the stroke of the load 203, the ball valve 201 makes contact with a valve seat 202 to close the hydraulic path connecting the first pipe member A1 and the intake side of the pump 11.

Next, a pressure control unit according to the third embodiment is described hereinafter. The pressure control unit is formed by two-position valves which are controlled by the electronic controller 100. That is, the pressure control unit provided in the first fluid line A includes first and second pressure increasing valves 300 and 301 for controlling pressure increase of the pressure applied to the first and second wheel cylinders 4 and 5 by controlling the flow of brake fluid from the master cylinder 3 and brake fluid discharged by the pump 11 towards the first and second wheel cylinders 4 and 5. Furthermore, the pressure control unit also includes first and second pressure reduction valves 302 and 303 for reducing the pressure applied to the first and second wheel cylinders 4 and 5 by transporting brake fluid from the first and second wheel cylinders 4 and 5 towards the reservoir 200. The first and second pressure reduction valves 302 and 303 are always closed except when the pressures applied on the first and second wheel cylinders 4 and 5 are being reduced.

The first and second pressure increasing valves 300 and 301 are in a communicable state during normal braking operations to apply master cylinder pressure PU generated by the master cylinder 3 to the first and second wheel cylinders 4 and 5. The first and second pressure increasing valves 300 and 301 are in a communicable state when the pressure increasing unit is being actuated and the pump 11 is drawing brake fluid from the first pipe member A1 and discharging brake fluid towards the second pipe member A2.

However, when the vehicle wheels tend to lock as determined based on output signals from the wheel speed sensors 54, 55, the first and second pressure increasing valves 300 and 301 are closed to limit the increase of pressure applied to the wheel cylinders 4 and 5. Also, when the pressure applied to the wheel cylinders 4 and 5 is being reduced, the first and second pressure increasing valves 300 and 301 are closed while the first and second pressure reduction valves 302 and 303 are open.

The increase and reduction of the pressure applied to the wheel cylinders 4 and 5 is performed independently for each wheel cylinder 4 and 5.

Also, when the pressure applied to the wheel cylinders 4 and 5 is reduced, the brake fluid drawn out to reduce the pressure is stored in the reservoir 200. During this time, because the path between the chamber 200C and the first pipe member A1 is blocked by the ball valve 201 and the valve seat 202, the pump 11 of the pressure increasing unit first draws brake fluid stored inside the reservoir 200 and discharges such brake fluid to the second pipe member A2. When there is no more brake fluid left in the reservoir 200, negative pressure generated by the pump 11 biases the load 203 in the direction of the first pipe member A1 and so, the pump 11 begins to draw brake fluid from the first pipe member A1 and discharges such brake fluid to the second pipe member A2.

A similar pressure increasing unit is also provided in the second fluid line B. Namely, the pressure increasing unit of the second fluid line B is formed by third and fourth pressure increasing valves 304 and 305 that correspond to the first and second pressure increasing valves 300 and 301 of the first fluid line A, third and fourth pressure reduction valves 306 and 307 that correspond to the first and second pressure reduction valves 302 and 303 of the first fluid line A, and a reservoir 400 that corresponds to the reservoir 200 of the first fluid line A.

The operation and effects of the brake system according to the third embodiment which includes pressure increasing units and pressure control units provided in the first and second fluid lines A and B are explained hereinafter.

With the pressure control unit provided in the first fluid line A, the pressure applied to the first and second wheel cylinders 4 and 5 are increased or reduced based on the slip rates of the front right wheel FR and the front left wheel FL, which are respectively coupled to the first and second wheel cylinders 4 and 5. In this case, because the first pressure increasing unit makes the pressure applied to the first and second wheel cylinders 4 and 5 higher than the master cylinder pressure PU, the pressure control unit performs pressure reduction of the pressure applied to the first and second wheel cylinders 4 and 5 at pressures higher than the master cylinder pressure PU. In this way, pressure for ensuring the generation of optimal braking forces in accordance with the road surface conditions is applied to the first and second wheel cylinders 4 and 5. This also holds true for the third and fourth wheel cylinders 6 and 7 of the second fluid line B. However, load transfer occurs in accordance with the deceleration in the wheel speeds when a brake force is being applied on a vehicle wheel. Also, there will be a difference between the reaction force applied by the road surface to the front wheels and the reaction force applied by the road surface to the rear wheels with such difference being in accordance with the load transfer. Thus, if the first and second pressure increasing units increase the pressures applied to the wheel cylinders 4–7 of the first and second fluid lines A and B in the same way, one might think that the rear wheels will tend to lock with the road surface exerting an inappropriate amount of reaction force on the rear wheels. However, this does not hold true for the brake system according to the present embodiment which is provided with the pressure control unit in the second fluid line B for adjusting the pressure applied to the third and fourth wheel cylinders 6 and 7 so that there is an optimal pressure difference between the pressure applied to the first and second wheel cylinders 4 and 5 of the front wheels and the pressure applied to the third and fourth wheel cylinders 6 and 7 of the rear wheels. In other words, when applying pressures to the wheel cylinders 4–7 that are higher than the master cylinder pressure PU, the pressures applied to the wheel cylinders 47 of the front and rear wheels can be adjusted to derive the maximum reaction force from the road surface and thus, a predetermined difference between the pressure applied to the first and second wheel cylinders 4 and 5 and the pressure applied to the third and fourth wheel cylinders 6 and 7 can be set which results in better braking performance and more stable vehicular movement. In this third embodiment, signals from the steering sensor 50 may also be employed for driving the pressure increasing units to assist the steering movements of the vehicle.

Although the present invention has been fully described in connection with preferred embodiments thereof with reference to the accompanying drawings, it is to be noted that various changes and modifications will become apparent to those skilled in the art.

For example, while the pressure increasing unit of the first fluid line A (second fluid line B) sets a difference between the pressure of the first pipe member A1 (B1) and pressure of the second pipe member A2 (B2) by reducing the amount of brake fluid in the first pipe member A1 (B1) and supplying the brake fluid drawn from the first pipe member A1 (B1) to the wheel cylinders 4 and 5 (6 and 7), there is no need to be limited to this type of arrangement. For example, the intake side of the pump 11 (13) may be connected to the master reservoir 3a with the pressure applied to the wheel cylinders 4 and 5 (6 and 7) being increased by supplying brake fluid to the wheel cylinders 4 and 5 (6 and 7). In this case, while there might be no decrease in the brake fluid in the first pipe member A1 (B1) which lessens the burden of the driver for depressing the brake pedal 1, this arrangement will still provide the other beneficial effects that are provided by the foregoing embodiments and will be able to provide stable movement for the vehicle.

Figure 11:
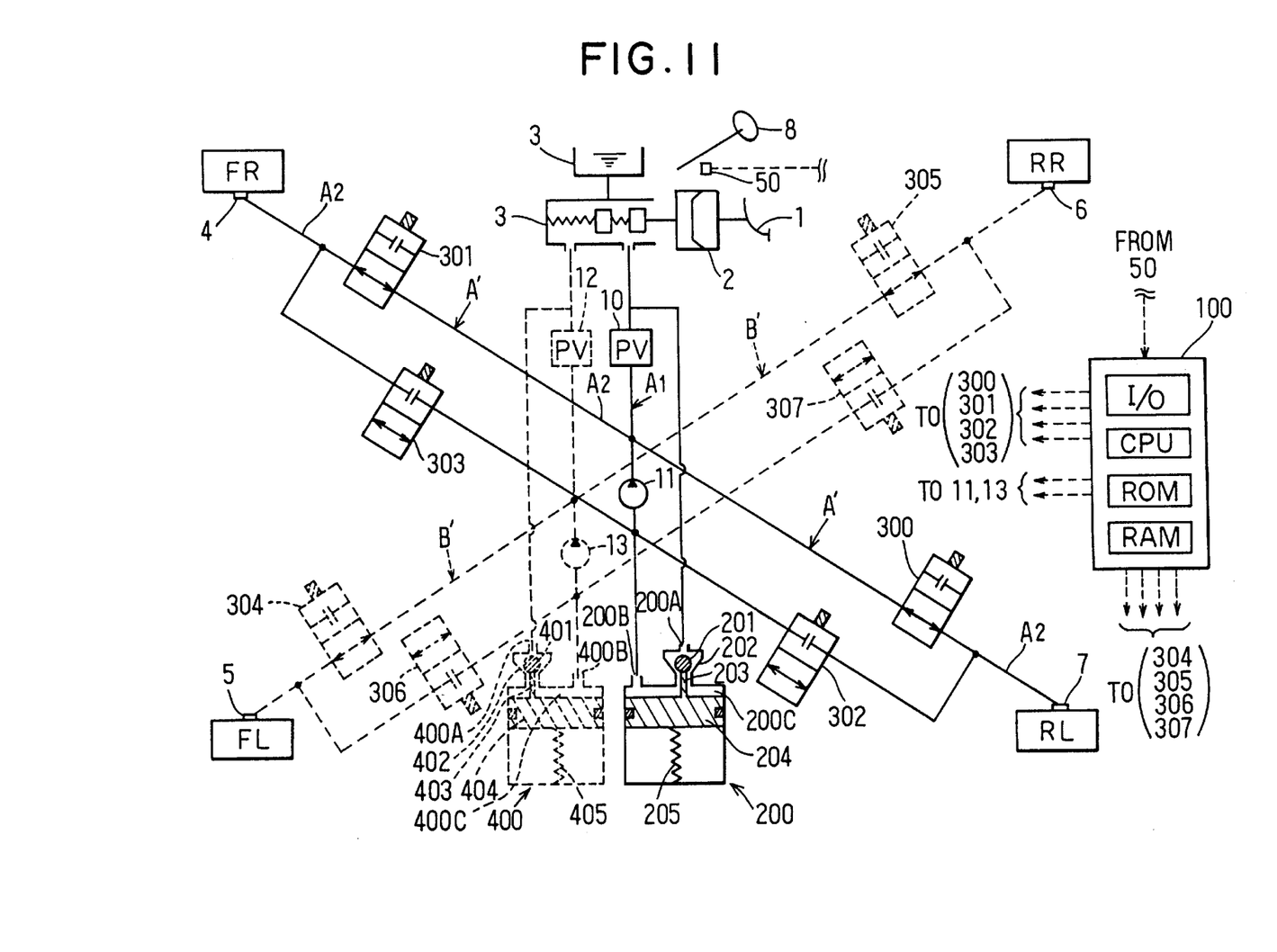
FIG. 11 is a schematic diagram of a further variation of the brake system.

While the foregoing embodiments have dealt on applying the present invention to fluid lines A and B which are coupled to the front wheels and rear wheels, respectively, of the vehicle, as shown in FIG. 11, the present invention may also be applied to vehicles having X-shaped fluid lines in which the front right wheel FR and the rear left wheel RL, and the front left wheel FL and the rear right wheel RR are coupled to each other.

That is, a first fluid line A' may be constructed to connect the first wheel cylinder 4 which applies a brake force on the front right wheel FR, the fourth wheel cylinder 7 which applies a brake force on the rear left wheel RL and the master cylinder 3. On the other hand, the second fluid line B' may be constructed to connect the second wheel cylinder 5 which applies a brake force on the front left wheel FL, the third wheel cylinder 6 which applies a brake force on the rear right wheel RR and the master cylinder 3. As pressure control units for adjusting the pressures applied to the wheel cylinders 3–7 in accordance with the movement of the vehicle as indicated by the wheel slip rates or the like, the fluid lines A' and B' are provided with valves 300–307, reservoirs 200, 400 and the like which perform the same functions as those units provided in the brake system according to the third embodiment. Also, the pump 11 and the proportional control valve 10 form the first pressure increasing unit of the first fluid line A' while the pump 13 and the proportional control valve 12 form the second pressure increasing unit of the second fluid line B'. These pressure increasing units set the pressures of the first and second fluid lines A' and B' so that their pressures are different from each other.

In the brake system having the above-described construction, a pressure difference between the pressures of the fluid lines A' and B' is set by actuating their pressure increasing units through the driving of the pumps 11 and 13 in accordance with the movement of the vehicle as determined from signals from the steering sensor 50 (not shown) which indicate the steering condition of the vehicle, signals from the wheel speed sensors (not shown) which indicate wheel speeds and wheel slip rates and the like. In this case, for example, when the vehicle is making a left turn, there will be a load transfer towards the left side of the vehicle and so, the pressure applied to the first fluid line A' is set higher than the pressure applied to the second fluid line B' so that the first wheel cylinder 4 can apply the maximum braking force on the front right wheel FR. In other words, the capacity of the pump 11 provided in the first fuel line A' is set higher than the capacity of the pump 13 provided in the second fuel line B'. In this case, while there might be excessive pressure applied on the wheel cylinder 7 coupled to the rear left wheel RL, such pressure may be adjusted by the pressure control unit and so, the vehicle movements can be stabilized. Also, the difference in the brake pressures between the fluid lines A' and B' may be adjusted based on the steering angle of the vehicle. That is, the pressure in the first fluid line A' is increased with sharper left turns. In this way, the front right wheel FR can apply the maximum braking forces in response to the load transfer that occurs during the left turn movement.

In this way, by providing a pressure difference between the pressures of the crisscrossing fluid lines A' and B' while setting their respective pressures to be higher than the master cylinder pressure PU, the steering performance of the vehicle can be improved in accordance with the steering conditions while assuring stable movement of the vehicle. It must be noted that the above operations may also be applied to the case when the vehicle is making a right turn. In this case, the pressure of the fluid line B' is controlled to be higher than the pressure of the fluid line A'.

Meanwhile, in the foregoing embodiments, the pressure increasing units have been provided in the first and second fluid lines A and B (A' and B') to provide a pressure difference in the pressures applied between the fluid lines A and B (A' and B') to adjust the vehicle movements in response to signals from the steering sensors, the vehicle speed sensors or the like. However, there is no need to be limited to this type of arrangement. For example, during turning operations, the pressure difference may be set to derive a predetermined yaw rate in the vehicle movements. Also, the difference in pressures between the fluid lines A and B (A' and B') may be adjusted to derive ideal load transfer conditions for the vehicle.

Meanwhile, while vehicle movements have been detected in the foregoing embodiments based on signals from the steering sensor, pedal stroke sensor, wheel speed sensors or the like, a vehicle acceleration sensor for detecting acceleration of the vehicle may also be provided such that the pressure being applied to the wheel cylinders of the front wheels are made greater than the pressure applied to the wheel cylinders of the rear wheels with the pressure difference between them being set to greater values in accordance with bigger acceleration rates. In other words, load transfer due to forward and backward acceleration of the vehicle may be detected based on signals from vehicle acceleration sensors. Also, in place of the steering sensor, a yaw rate sensor may be used for detecting load transfer during turning operations of the vehicle.

Such changes and modifications are to be understood as being within the scope of the present invention as defined by the appended claims.

What is claimed is:

1. A brake system for vehicles comprising:
    first brake fluid pressure generating means having a brake fluid pressure generating source for generating a first brake fluid pressure to apply a brake force to a vehicle;
    first wheel brake force generating means for applying a predetermined wheel brake force to a first wheel and a second wheel in response to the first brake fluid pressure from the generating source;
    second wheel brake force generating means for applying a predetermined wheel brake force to a third wheel and a fourth wheel in response to the first brake fluid pressure from the generating source;
    a first fluid line connecting the generating source and the first wheel brake force generating means;
    a second fluid line connecting the generating source and the second wheel brake force generating means;
    vehicle longitudinal motion detecting means for detecting a longitudinal motion of a vehicle body; and
    pressure difference forming means having first increasing means in the first fluid line and second increasing means in the second fluid line, the first increasing means being for forming a second brake fluid pressure higher than the first brake fluid pressure to apply the second brake fluid pressure to the first wheel brake force generating means and the second increasing means being for forming a third brake fluid pressure higher than the first brake fluid pressure to apply the third brake fluid pressure to the second wheel brake force generating means, wherein:
    at least one of the first increasing means and the second increasing means is rendered operative to form a pressure difference between brake fluid pressures applied to the first wheel brake force generating means and to the second wheel brake force generating means in response to the detected longitudinal motion of the vehicle,
    the vehicle motion detecting means is for detecting a movement of load on the vehicle in a vehicle longitudinal direction during a vehicle braking operation; and
    the pressure difference forming means is for forming the pressure difference between the brake pressures applied to the first wheel brake force generating means and to the second wheel brake force generating means in response to the detected movement of load.

2. A brake system for vehicles of claim 1, wherein:
    the vehicle longitudinal motion detecting means is for detecting the longitudinal motion based on a stroke of depression of a brake pedal; and
    the pressure difference forming means is for increasing the pressure difference between the front wheels and the rear wheels as the detected stroke of depression is increased.

3. A brake system for vehicles of claim 1, wherein:
    the vehicle longitudinal motion detecting means is for detecting the longitudinal motion based on an acceleration of the vehicle body in a longitudinal direction.

4. A brake system for vehicles of claim 1, wherein:
    the pressure difference forming means is for forming a pressure difference between the second brake fluid pressure and the third brake fluid pressure to form a pressure difference between the pressures applied to the first wheel brake force generating means and to the second wheel brake force generating means.

5. A brake system for vehicles of claim 1, wherein:
    the first increasing means is for decreasing a brake fluid of the first brake fluid pressure by a predetermined amount when the brake fluid pressure generating means generates the first brake fluid pressure in the first fluid line, for increasing the brake fluid pressure applied to the first wheel brake force generating means to the second brake fluid pressure by the predetermined amount of decreased brake fluid, and for applying the second brake fluid pressure to the first wheel brake force generating means.

6. A brake system for vehicles of claim 1, wherein:

the second increasing means is for decreasing a brake fluid of the first brake fluid pressure by a predetermined amount when the brake fluid pressure generating means generates the first brake fluid pressure in the second fluid line, for increasing the brake fluid pressure applied to the first wheel brake force generating means to the third brake fluid pressure by the predetermined amount of decreased brake fluid, and for applying the third brake fluid pressure to the second wheel brake force generating means.

7. A brake system for vehicles of claim 1, wherein:

the pressure difference forming means is for executing, by at least one of the first increasing means and the second increasing means, a discharge of brake fluid toward at least one of the first wheel brake force generating means and the second brake force generating means from a brake fluid source of a brake fluid pressure lower than the first brake fluid pressure when the brake fluid pressure generates the first brake fluid pressure, and an increase in the amount of a brake fluid relative to at least one of the first wheel brake force generating means and the second wheel brake force generating means.

8. A brake system for vehicles of claim 1, wherein:

the vehicle motion detecting means includes wheel motion detecting means each of which detects each wheel motion of the first wheel, the second wheel, the third wheel and the fourth wheel, and estimates the vehicle body motion from the wheel motion of each wheel.

9. A brake system for vehicles of claim 8, wherein:

the wheel motion detecting means includes wheel speed detecting means each of which detects each wheel speed of the first wheel, the second wheel, the third wheel and the fourth wheel.

10. A brake system for vehicles of claim 1, wherein:

the vehicle motion detecting means is for detecting a turning condition of the vehicle in the course of braking under a vehicle turning condition; and the pressure difference forming means is for forming the pressure difference between the brake pressures applied to the first wheel brake force generating means and to the second wheel brake force generating means in response to the detected turning condition.

11. A brake system for vehicles of claim 1, wherein:

the pressure difference forming means includes operation condition detecting means for detecting vehicle body operation condition by a driver; and the pressure difference is formed in response to both of the detected vehicle body operation condition and the detected vehicle body motion.

12. A brake system for vehicles of claim 1, wherein:

the pressure difference forming means includes a vehicle deceleration detecting means for detecting a vehicle body deceleration during a vehicle braking operation; and the pressure difference is formed in response to the detected vehicle body deceleration.

13. A brake system for vehicles of claim 1, wherein:

at least one of the first wheel brake force generating means and the second wheel brake force generating means includes pressure reducing means which reduces the brake fluid pressure applied to the wheel brake force generating means in response to a road surface limit of each wheel.

14. A brake system for vehicles of claim 1, wherein:

the first wheel, the second wheel, the third wheel and the fourth wheel are a left front wheel, a right front wheel, a left rear wheel and a right rear wheel of the vehicle, respectively; and the first fluid line and the second fluid line are for the front wheels and the rear wheels, respectively.

15. A brake system for vehicles of claim 14, wherein:

the pressure difference forming means is for forming the pressure difference to equalize wheel motions among the wheels during a vehicle braking operation.

16. A brake system for vehicles of claim 1, wherein:

the first wheel, the second wheel, the third wheel and the fourth wheel are a left front wheel, a right front wheel, a left rear wheel and a right rear wheel of the vehicle, respectively; and the first fluid line and the second fluid line are in crossing relationship with each other between the front wheels and the rear wheels.

17. A brake system for vehicles of claim 16, wherein:

the pressure difference forming means is for forming the pressure difference to equalize wheel motions among the wheels during a vehicle braking operation.

18. A brake system for vehicles of claim 16, wherein:

the pressure difference forming means is for forming the pressure difference to equalize a reaction force which each front wheel receives from a road surface and a reaction force which each rear wheel receives from the road surface during a vehicle braking operation.

19. A brake system for vehicles of claim 16, wherein:

the pressure difference forming means is for forming the pressure difference to equalize a reaction force which each of the first wheel, the second wheel, the third wheel and the fourth wheel receives from a road surface thereby to equalize a wheel slip condition of each wheel during a vehicle braking operation.

20. A brake system for vehicles of claim 5, wherein:

the pressure increasing means includes holding means for holding the pressure difference between the first brake fluid pressure and the second brake fluid pressure.

21. A brake system for vehicles of claim 20, wherein:

the holding means includes a proportional valve which attenuates a pressure at a predetermined attenuation ratio from the wheel brake force generating means of the second brake fluid pressure to the generating source thereby to hold the pressure difference.

22. A brake system for vehicles of claim 1, wherein:

the pressure difference forming means includes vehicle lateral motion detecting means for detecting a lateral motion of the vehicle body; and the pressure difference is formed in response to both of the detected longitudinal motion and the detected lateral motion of the vehicle body.

23. A brake system for vehicles of claim 22, wherein:

the vehicle lateral motion detecting means includes at least one of a yaw rate sensor, steering angle sensor and a lateral acceleration sensor.

24. A brake system for vehicles comprising:

first brake fluid pressure generating means having a brake fluid pressure generating source for generating a first brake fluid pressure to apply a brake force to a vehicle;

first wheel brake force generating means for applying a predetermined wheel brake force to a first wheel and a second wheel in response to the first brake fluid pressure from the generating source;

second wheel brake force generating means for applying a predetermined wheel brake force to a third wheel and a fourth wheel in response to the first brake fluid pressure from the generating source;

a first fluid line connecting the generating source and the first wheel brake force generating means;

a second fluid line connecting the generating source and the second wheel brake force generating means;

vehicle longitudinal motion detecting means for detecting a longitudinal motion of a vehicle body; and pressure difference forming means having first increasing means in the first fluid line and second increasing means in the second fluid line, the first increasing means being for forming a second brake fluid pressure higher than the first brake fluid pressure to apply the second brake fluid pressure to the first wheel brake force generating means and the second increasing means being for forming a third brake fluid pressure higher than the first brake fluid pressure to apply the third brake fluid pressure to the second wheel brake force generating means, wherein:

at least one of the first increasing means and the second increasing means is rendered operative to form a pressure difference between brake fluid pressures applied to the first wheel brake force generating means and to the second wheel brake force generating means in response to the detected longitudinal motion of the vehicle, the first increasing means is for decreasing a brake fluid of the first brake fluid pressure by a predetermined amount when the brake fluid pressure generating means generates the first brake fluid pressure in the first fluid line, for increasing the brake fluid pressure applied to the first wheel brake force generating means to the second brake fluid pressure by the predetermined amount of decreased brake fluid, and for applying the second brake fluid pressure to the first wheel brake force venerating means, the pressure increasing means includes holding means for holding the pressure difference between the first brake fluid pressure and the second brake fluid pressure, and the holding means is for reducing substantially the pressure difference between the first brake fluid pressure and the second brake fluid pressure to zero when the first brake fluid pressure generated by the generating source is lowered to less than a predetermined pressure.

25. A brake system for vehicles of claim 24, wherein:

the vehicle longitudinal motion detecting means is for detecting the longitudinal motion based on a stroke of depression of a brake pedal; and the pressure difference forming means is for increasing the pressure difference between the front wheels and the rear wheels as the detected stroke of depression is increased.

26. A brake system for vehicles of claim 24, wherein:

the vehicle longitudinal motion detecting means is for detecting the longitudinal motion based on an acceleration of the vehicle body in a longitudinal direction.

27. A brake system for vehicles of claim 24, wherein:

the pressure difference forming means is for forming a pressure difference between the second brake fluid pressure and the third brake fluid pressure to form a pressure difference between the pressures applied to the first wheel brake force generating means and to the second wheel brake force generating means.

28. A brake system for vehicles of claim 24, wherein:

the second increasing means is for decreasing a brake fluid of the first brake fluid pressure by a predetermined amount when the brake fluid pressure generating means generates the first brake fluid pressure in the second fluid line, for increasing the brake fluid pressure applied to the first wheel brake force generating means to the third brake fluid pressure by the predetermined amount of decreased brake fluid, and for applying the third brake fluid pressure to the second wheel brake force generating means.

29. A brake system for vehicles of claim 24, wherein:

the pressure difference forming means is for executing, by at least one of the first increasing means and the second increasing means, a discharge of brake fluid toward at least one of the first wheel brake force generating means and the second brake force generating means from a brake fluid source of a brake fluid pressure lower than the first brake fluid pressure when the brake fluid pressure generates the first brake fluid pressure, and an increase in the amount of a brake fluid relative to at least one of the first wheel brake force generating means and the second wheel brake force generating means.

30. A brake system for vehicles of claim 24, wherein:

the vehicle motion detecting means includes wheel motion detecting means each of which detects each wheel motion of the first wheel, the second wheel, the third wheel and the fourth wheel, and estimates the vehicle body motion from the wheel motion of each wheel.

31. A brake system for vehicles of claim 30, wherein:

the wheel motion detecting means includes wheel speed detecting means each of which detects each wheel speed of the first wheel, the second wheel, the third wheel and the fourth wheel.

32. A brake system for vehicles of claim 24, wherein:

the vehicle motion detecting means is for detecting a turning condition of the vehicle in the course of braking under a vehicle turning condition; and the pressure difference forming means is for forming the pressure difference between the brake pressures applied to the first wheel brake force generating means and to the second wheel brake force generating means in response to the detected turning condition.

33. A brake system for vehicles of claim 24, wherein:

the pressure difference forming means includes operation condition detecting means for detecting vehicle body operation condition by a driver; and the pressure difference is formed in response to both of the detected vehicle body operation condition and the detected vehicle body motion.

34. A brake system for vehicles of claim 24, wherein:

the pressure difference forming means includes a vehicle deceleration detecting means for detecting a vehicle body deceleration during a vehicle braking operation; and the pressure difference is formed in response to the detected vehicle body deceleration.

35. A brake system for vehicles of claim 24, wherein:

at least one of the first wheel brake force generating means and the second wheel brake force generating means includes pressure reducing means which reduces the brake fluid pressure applied to the wheel brake force generating means in response to a road surface limit of each wheel.

36. A brake system for vehicles of claim 24, wherein:

the first wheel, the second wheel, the third wheel and the fourth wheel are a left front wheel, a right front wheel, a left rear wheel and a right rear wheel of the vehicle, respectively; and the first fluid line and the second fluid line are for the front wheels and the rear wheels, respectively.

37. A brake system for vehicles of claim 24, wherein:

the first wheel, the second wheel, the third wheel and the fourth wheel are a left front wheel, a right front wheel, a left rear wheel and a right rear wheel of the vehicle, respectively; and the first fluid line and the second fluid line are in crossing relationship with each other between the front wheels and the rear wheels.

38. A brake system for vehicles of claim 36, wherein:

the pressure difference forming means is for forming the pressure difference to equalize wheel motions among the wheels during a vehicle braking operation.

39. A brake system for vehicles of claim 37, wherein:

the pressure difference forming means is for forming the pressure difference to equalize wheel motions among the wheels during a vehicle braking operation.

40. A brake system for vehicles of claim 37, wherein:

the pressure difference forming means is for forming the pressure difference to equalize a reaction force which each front wheel receives from a road surface and a reaction force which each rear wheel receives from the road surface during a vehicle braking operation.

41. A brake system for vehicles of claim 37, wherein:

the pressure difference forming means is for forming the pressure difference to equalize a reaction force which each of the first wheel, the second wheel, the third wheel and the fourth wheel receives from a road surface thereby to equalize a wheel slip condition of each wheel during a vehicle braking operation.

42. A brake system for vehicles of claim 24, wherein:

the holding means includes a proportional valve which attenuates a pressure at a predetermined attenuation ratio from the wheel brake force generating means of the second brake fluid pressure to the generating source thereby to hold the pressure difference.

43. A brake system for vehicles of claim 24, wherein:

the pressure difference forming means includes vehicle lateral motion detecting means for detecting a lateral motion of the vehicle body; and the pressure difference is formed in response to both of the detected longitudinal motion and the detected lateral motion of the vehicle body.

44. A brake system for vehicles of claim 43, wherein:

the vehicle lateral motion detecting means includes at least one of a yaw rate sensor, steering angle sensor and a lateral acceleration sensor.

* * * * *